United States Patent [19]

Carroll et al.

[11] 3,860,585

[45] Jan. 14, 1975

[54] PENICILLIN KETENIMINE INTERMEDIATES FOR PREPARING OXACILLIN

[75] Inventors: Ronnie D. Carroll, East Lyme; Ernest S. Hamanaka, Groton; Donald K. Pirie, Montville; Willard M. Welch, Jr., North Stonington, all of Conn.

[73] Assignee: Pfizer Inc., New York, N.Y.

[22] Filed: Nov. 2, 1971

[21] Appl. No.: 194,923

[52] U.S. Cl....... 260/240 R, 260/239.1, 260/243 C, 260/306.7 C, 260/566 R, 424/271
[51] Int. Cl............................................. C07d 25/02
[58] Field of Search.......... 260/566 R, 566 D, 239.1

[56] References Cited
UNITED STATES PATENTS 2,820,781   1/1958   Stevens............................ 260/566 R
3,669,980   6/1972   Bogash............................. 260/243 C

OTHER PUBLICATIONS

Stevens et al., J. American Chemical Soc., Vol. 75, pp. 657–660 (1953).

Stevens et al., J. American Chem. Soc., Vol. 76, pp. 4398–4402 (1954).

*Primary Examiner*—Donald G. Daus
*Assistant Examiner*—Jose Tovar
*Attorney, Agent, or Firm*—Connolly and Hutz

[57] ABSTRACT

Phenyl- and phenoxyketene-N-6-penicillanic acid-imine esters as useful intermediates in the preparation of oxacillin.

7 Claims, No Drawings

PENICILLIN KETENIMINE INTERMEDIATES FOR PREPARING OXACILLIN

BACKGROUND OF THE INVENTION

The invention relates to the synthesis of penicillins, and more particularly to a class of novel intermediates useful in the preparation of 6-(5-methyl-3-phenyl-4-isoxazolylamido)penicillanic acid and ester derivatives thereof.

The compounds in the group belonging to the family of penicillins differ from each other in the nature of the R variable and possess the general formula indicated below wherein the acyl moiety on the 6-aminopenicillanic acid is derived from a carboxylic acid or functional derivative thereof such as an acyl chloride or anhydride.

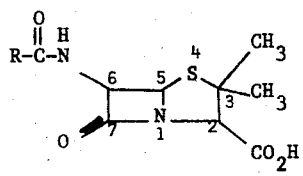

The pharmacodynamic and antibiotic properties of a given penicillin are determined to a great extent by the nature of the R group. The most widely used penicillins are those wherein the R moiety is represented by benzyl-, phenoxymethyl, and α-phenoxyethyl. While these well-known analogs are highly antagonistic toward gram-positive organisms they have limited activity against stapholococcal penicillinase.

One such penicillin derivative which has proved effective against staphylococcal infections is 6-(5-methyl-3-phenyl-4-isoxazolylamido)penicillanic acid (oxacillin), U.S. Pat. No. 2,996,501, and is synthesized via acylation of 6-aminopenicillanic acid with 5-methyl-3-phenylisoxazole-4-carbonyl chloride as follows:

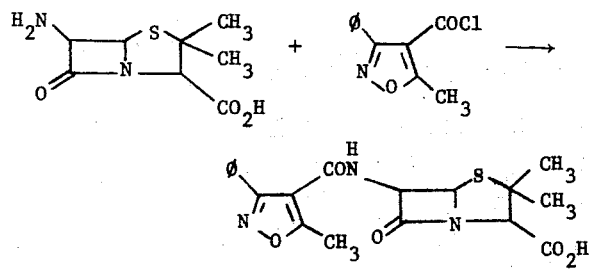

SUMMARY OF THE INVENTION

It has now been found that a group of novel penicillins of the formula:

wherein R is selected from the group consisting of phenyl and phenoxy; and $R_1$ is selected from the group consisting of 1-alkanoyloxyalkyl wherein said alkanoyloxy contains from 2 to 5 carbon atoms and said alkyl contains from 1 to 4 carbon atoms; phenacyl; benzyl and benzyl substituted by 4-bromo, 4-nitro and 3,5-di-t-butyl-4-hydroxy; bis(4-methoxyphenyl)methyl; trimethylsilyl; and benzylideneiminooxy are useful intermediates in a synthetic process leading to the production of 6-(5-methyl-3-phenyl-4-isoxazolylamido)penicillanic acid.

The aforementioned narrow range of preferred ester blocking groups, $R_1$, should not be considered limiting in nature, since a much larger scope of said protecting groups are operable in the present invention. For example, the phenacyl, benzyl, diphenylmethyl and benzylideneiminooxy moieties can have one or more nuclear substituents, said substituents being those organic radicals most frequently found on aromatic rings.

Further, $R_1$ can be cycloalkyl, phenyl and mono- or disubstituted phenyl, alkyl and alkyl substituted with alkoxy, alkylthio, hydroxy, carboxy, carboxamido and halo.

Also considered within the scope of the present invention are ketenimines in the cephalosporin series of antibiotics as follows:

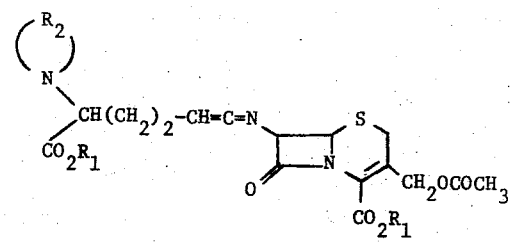

wherein $R_1$ is as previously indicated and $R_2$ is a divalent amino blocking group, e.g., phthaloyl.

A preferred class of congeners within the group of ketenimine penicillins are those where R is phenyl and $R_1$ is selected from the group comprising 1-alkanoyloxyalkyl wherein said alkyl contains 1 to 4 carbon atoms and said alkanoyloxy contains 2 to 5 carbon atoms, trimethylsilyl and 4-nitrobenzyl.

DETAILED DESCRIPTION OF THE INVENTION

The novel and valuable ketenimine penicillin compounds of the present invention, useful in the synthesis of oxacillin, are prepared from the appropriate penicillin ester as illustrated:

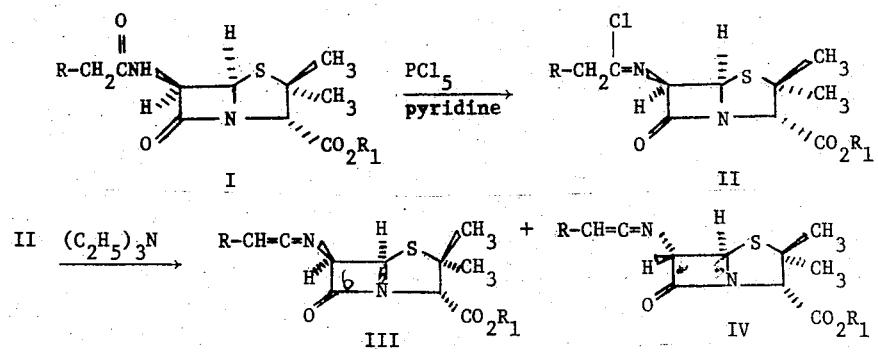

wherein R and $R_1$ are as previously indicated.

In practice, penicillins of formula I are converted to their imino chlorides by treatment with phosphorous pentachloride or phosgene. Experimentally, 1 mole of I is contacted with one mole of phosphorous pentachloride, plus as much as a 10% excess, and 4 moles of pyridine in an anhydrous, reaction-inert solvent such as methylene chloride, chloroform or tetrachloroethylene. The reaction, which is conducted at ice-bath temperatures, comprises the addition of phosphorous pentachloride over a period of 20 minutes to a precooled solution of I and pyridine in the appropriate solvent. Under these conditions the reaction is substantially complete in 20–40 minutes. In instances wherein $R_1$ is trimethylsilyl it is preferred that phosgene and one mole of base be employed.

The above-described reaction is quenched with cold, aqueous sodium bicarbonate (2%) and the organic layer containing the desired product subsequently dried over magnesium sulfate and concentrated in vacuo. The product (II) is employed in the next reaction without further purification.

Conversion of the imino chloride (II) to the ketenimine penicillins is effected in a reaction-inert solvent employing a tertiary amine. The most suitable solvents for this reaction are liquid aromatic hydrocarbons, the preferred solvent being benzene. Although a great number of amines can effectively be employed to generate the ketenimines, it is preferred that said amines have a basicity greater than that of pyridine. The preferred amine for reasons of economy is triethylamine. Experimentally, the imino chloride (II) in the appropriate solvent is treated with slightly less than one equivalent of triethyl amine or a sufficiently basic amine to generate ketenimine penicillins. Said reaction is carried out at ambient temperatures and requires approximately 45–60 minutes for completion.

When the aforedescribed reaction is complete, the solvent is removed under reduced pressure and the residual material, comprised of product and amine hydrochloride, is extracted with ether. The ether containing the desired ketenimine penicillin is separated from the residual solids and subsequently removed in vacuo to provide the desired product.

Since the ketenimine penicillins of the present invention are sensitive organic compounds which on prolonged standing or heating will undergo degradation reactions, it is preferred that said compounds be employed in subsequent reactions without further purification. Evidence for the structure of the ketenimine penicillins is characterized by the definitive chemical reactions this class of compounds will undergo; in addition, the infrared spectra of ketenimine penicillins exhibit cumulene absorption at 2030 cm$^{-1}$ in accordance with that noted for ketenimines by Krow, *Angew. Chem. internat.* Edit., 10, 435 (1971).

During the conversion of the imino chloride (II) to ketenimine penicillins it has been noted that two very similar products are formed. It has been further ascertained that said products are the "normal" product (III) and the epimeric product (IV) distinguishable by nuclear magnetic resonance field position and coupling constants. As one skilled in the art of penicillin conformations realizes, the normal isomer possesses a stereochemical configuration which places the hydrogen at the $C_5$ and $C_6$ positions on the same face or side of the β-lactam ring and more specifically, designated according to the method of Cahn. et al., *Experientia*, 12, 81 (1956) as 1S:2R:5R:6R, while the epimeric product, $C_6$-epi, possesses a configuration in which the $C_6$-proton has been epimerized to the side or face of the β-lactam opposite that of the $C_5$ proton, designated 1S:2R:5R:6S. The configuration of naturally occuring penicillins in which the hydrogens or protons of the $C_5$, $C_6$ and the carboxyl group at $C_3$ are on the same side or face of the penicillin molecule is considered the normal conformation. Further, it is the normal ketenimine penicillins (III) which are of primary interest as intermediates leading to the synthesis of oxacillin.

As previously mentioned, the stability of the herein described ketenimine penicillins is such as to preclude any attempted separation by methods known to those skilled in the art of the epimeric products formed in the above described reaction. It is preferred that said mixture of epimers be converted to a mixture of normal and epimeric oxacillins and the desired normal oxacillin separated therefrom.

Conversion of the ketenimine penicillins to oxacillin is illustrated as follows:

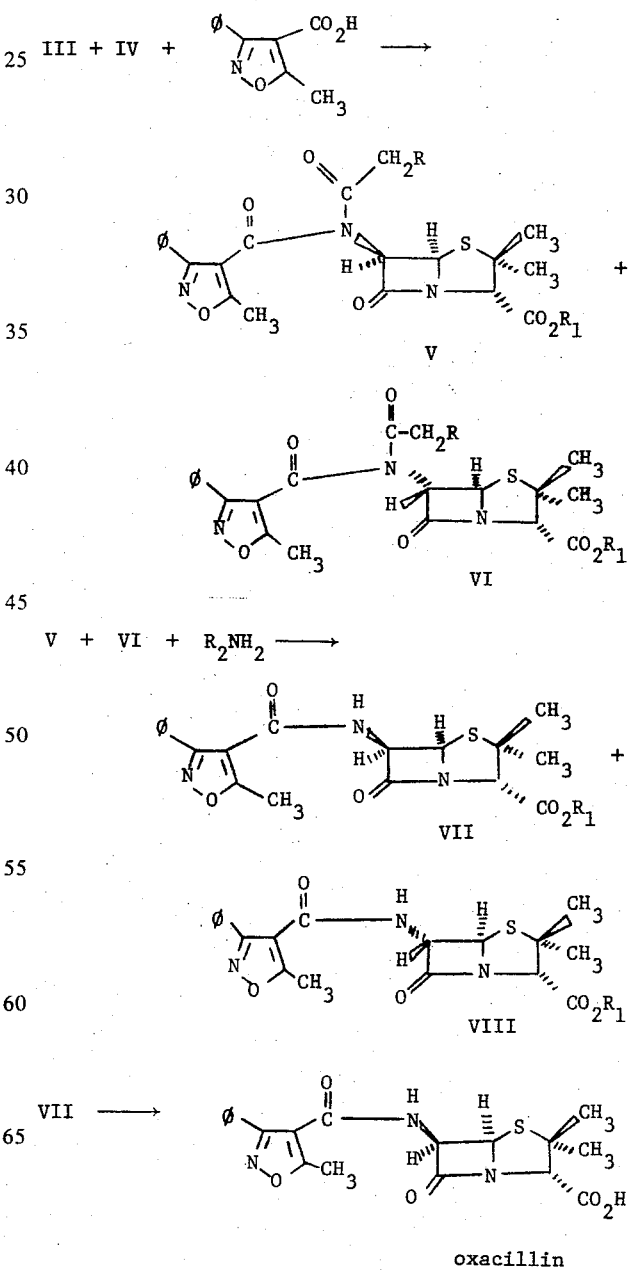

wherein R and $R_1$ are as previously indicated and $R_2$ is alkyl or cycloalkyl.

Experimentally, the mixture of ketenimine penicillin epimers (III and IV) is contacted with an equimolar amount of 5-methyl-3-phenylisoxazole-4-carboxylic acid in a reaction-inert solvent, e.g., benzene, chloroform, or ether. Said reaction is conducted at room temperature for a reaction time of 12–18 hours. On completion of the reaction the organic phase is washed with a dilute sodium bicarbonate solution, dried over anhydrous sodium sulfate and concentrated in vacuo to dryness. The residual diacyl product (V and VI) which has the appearance of a yellow-brown foam can be separated from any by-products by chromatographing on a silica gel column. Nuclear magnetic resonance studies indicate the purified mixture of epimer diacyl compounds to be in a ratio of approximately 40% normal and 60% epimeric isomer.

Treatment of the epimeric diacyl compounds V and VI with an alkyl or cycloalkyl amine results in removal of the phenoxy- or phenylacetyl moiety and formation of the corresponding ester of oxacillin. In practice, the epimeric mixture in a reaction-inert solvent such as benzene is treated with an equimolar amount of an amine such as cyclohexylamine plus as much as a 10% excess. After 3–5 hours at room temperature the reaction is complete and the organic phase is diluted with ether and washed successively with dilute hydrochloric acid, sodium bicarbonate, water and saturated sodium chloride solution. The organic layer is separated, dried over sodium sulfate and the solvent removed under reduced pressure. The crude product is chromatographed on a silica gel column and the desired normal ester of oxacillin eluted and separated from its epimeric counterpart by an eluate comprised of approximately 90% benzene and 10% ether.

The methods employed for removal of the ester protecting groups $R_1$ from VII are inherently dependent on the nature of said group and are well known in the art. For example, when $R_1$ is benzyl, substituted benzyl or bis(p-anisyl)-methyl it can conveniently be removed via a debenzylation reaction employing 5–10% palladium-on-charcoal and hydrogen. Said reaction is conducted in a reaction-inert solvent such as ethyl acetate and a hydrogen pressure from atmospheric pressure to 5–10 psi.

When $R_1$ is benzylideneiminooxy or phenacyl the blocking group is removed by treatment of said ester with as much as a molar equivalent of sodium thiophenoxide in an appropriate solvent such as dimethylformamide.

Both bis(p-anisyl)methane and 3,5-di-t-butyl-4-hydroxybenzyl are removed by treatment of said esters with acid at pH 1–2 for a period of 2–6 minutes.

The blocking group comprising trimethylsilyl is generally hydrolyzed early in the synthesis of oxacillin. Since it is sensitive to water it is removed during the work-up of the previously described reaction leading to the formation of the diacyl compounds, and results in the isolation of V and VI wherein $R_1$ is hydrogen. The reaction sequence can be continued with the unmasked carboxyl group taking precautionary steps to avoid basic water washes in subsequent reaction steps, or the carboxyl group can be reprotected by employing one of the other aforementioned blocking groups and the synthetic sequence continued in the previously mentioned manner.

Protecting groups comprising 1-alkanoyloxyalkyl are removed by basic hydrolysis of the requisite esters. In practice, this is achieved by exposing the appropriate ester to a pH 10–10.5 borate buffer for from 6 to 10 minutes. A water miscible nonaqueous solvent is employed such as acetone to provide a single contact phase.

Further, the 1-alkanoyloxyalkyl esters of oxacillin although inactive or of relatively low activity against microorganisms in vitro are, when administered orally to animals, including man, metabolized to the parent acid, which has a wide spectrum of activity against bacteria. They thus serve as pro-drug forms of the parent compound since they are biologically converted in vivo to said compounds. The rate of metabolic conversion of such esters in the parent acid occurs at such a rate as to provide an effective and prolonged concentration of the parent acid in the animal body. In effect, such esters act as depot sources for the parent acid.

Table I presents in vivo data for 6-(5-methyl-3-phenyl-4-isoxazolylamido)penicillanic acid, pivaloyloxymethyl ester against several experimental infections in mice.

The values (survival/total number of infected mice) are obtained under standard conditions familiar to those skilled in the art. The test compound is administered to the infected mice by a multiple dosing regimen in which the first dose is given 0.5 hours after inoculation and is repeated 4 and 24 hours later.

TABLE I

In vivo Data for 6-(5-methyl-3-phenyl-4-isoxazolylamido)penicillanic acid, pivaloyloxymethyl ester, vs. several bacterial infections in mice*

| DOSE | E. coli 266 | | S. aureus | | S. pyogenes | |
|---|---|---|---|---|---|---|
| | PO | SQ | PO | SQ | PO | SQ |
| 200 | 3/10 | 2/10 | 8/10 | 9/10 | 10/10 | 10/10 |
| 50 | 3/10 | 2/10 | 4/10 | 6/10 | 10/10 | 10/10 |

PO=oral; SQ=subcutaneous route of administration. Ratio of survivors/total mice.

The preferred ketenimine penicillins of the present invention useful in the synthesis of 6-(5-methyl-3-phenyl-4-isoxazolylamido)penicillanic acid are phenylketene-N-(2-[p-nitrobenzyloxycarbonyl]-3,3-dimethyl-7-oxo-4-thia-1-azabicyclo[3.2.0]hept-6-yl)imine, phenylketene-N-(2-trimethylsilyloxycarbonyl-3,3-dimethyl-7-oxo-4-thia-1-azabicyclo[3.2.0]hept-6-yl)imine and phenylketene-N-(2-[pivaloyloxymethyloxycarbonyl]-3,3-dimethyl-7-oxo-4-thia-1-azabicyclo-[3.2.0]hept-6-yl)imine.

The starting reagents leading to the synthesis of I are phenoxy- and benzylpenicillin which are commercially available. Employing the methods of Barnden et al., *J. Chem. Soc.*, 3733 (1953) and Jansen et al., *J. Chem. Soc.*, 2127 (1965) the requisite phenoxy- and benzylpenicillins are converted to the appropriate esters. This comprises either direct alkylation of the 2-carboxyl group or formation of a mixed anhydride and its subsequent reaction with the requisite alcohol.

The following examples are provided solely for the purpose of illustration and are not to be construed as limitations of this invention, many variations of which are possible without departing from the spirit or scope thereof.

EXAMPLE 1

Phenylketene-N-(2-[pivaloyloxymethyloxycarbonyl]-3,3-dimethyl-7-oxo-4-thia-1-azabicyclo[3.2.0]hept-6- yl)imine (III and IV: R = $C_6H_5$; $R_1$ = $(CH_3)_3CCO_2CH_2$—)

A. N-(2-[pivaloyloxymethyloxycarbonyl]-3,3-dimethyl-7-oxo-4-thia-1-azabicyclo[3.2.0]hept-6-yl)phenylacetimidyl chloride (II: R = $C_6H_5$; $R_1$ = $(CH_3)_3CCO_2CH_2$—)

A flame dried flask fitted with a drying tube and magnetic stirrer is charged with 20 g. (0.044 mole) of 6-phenylacetamidopenicillanic acid, pivaloyloxymethyl ester in 400 ml. of methylene chloride and cooled to 0° C. To the resulting solution is added 15.2 g. (0.192 mole) of pyridine followed by the portionwise addition of 9.98 g. (0.048 mole) of phosphorous pentachloride over a period of 20 minutes. The yellow reaction mixture is stirred at 0° C. for an additional 20 minutes and is then layered over with an iced solution of sodium bicarbonate and stirred gently. The organic phase is washed twice more with the bicarbonate solution and finally with a saturated sodium chloride solution. The organic phase is separated, dried over sodium sulfate and concentrated in vacuo to a brown gum, 21.0 g. The imino chloride product is used withoug further purification.

B. Phenylketene-N-(2-[pivaloyloxymethyloxycarbonyl]-3,3-dimethyl-7-oxo-4-thia-1-azabicyclo[3.2.0]hept-6-yl)imine (III and IV: R = $C_6H_5$; $R_1$ = $(CH_3)_3CCO_2CH_2$—)

To a solution of 13.1 g. (0.028 mole) of N-(2-[pivaloyloxymethyloxycarbonyl]-3,3-dimethyl-7-oxo-4-thia-1-azabicyclo[3.2.0]hept-6-yl)phenylacetimidyl chloride in 80 ml. of benzene is added dropwise 2.22 g. (0.022 mole) of triethylamine. After the reaction mixture has stirred at room temperature for 75 minutes the solvent is removed under reduced pressure and the residue triturated several times with ether. The ether washes are combined and the solvent removed in vacuo. The yellow-brown residual product, 11.1 g., is employed without further purification.

EXAMPLE 2

Starting with the appropriate penicillin ester and following the general procedure of Example 1, the following ketenimine penicillins are synthesized:

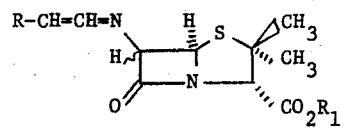

| R | $R_1$ |
|---|---|
| $C_6H_5$— | $CH_3CO_2CH_2$— |
| $C_6H_5$— | $CH_3CH_2CO_2CH_2$— |
| $C_6H_5$— | $(CH_3)_2CHCO_2CH_2$— |
| $C_6H_5$ | $CH_3CO_2CH(CH_3)$— |
| $C_6H_5$— | $(CH_3)_2CHCO_2CH(CH_3)$— |
| $C_6H_5$— | $(CH_3)_3CCO_2CH(CH_3)$— |
| $C_6H_5$— | $CH_3CO_2CH(C_2H_5)$— |
| $C_6H_5$— | $CH_3(CH_2)_2CO_2CH(C_2H_5)$— |
| $C_6H_5$— | $(CH_3)_2CHCH_2CO_2CH_2$— |
| $C_6H_5$— | $CH_3CO_2CH(n-C_3H_7)$— |
| $C_6H_5$— | $CH_3CO_2CH(i-C_3H_7)$— |
| $C_6H_5$— | $(CH_3)_3CCO_2CH(C_2H_5)$— |
| $C_6H_5O$— | $(CH_3)_3CCO_2CH_2$— |
| $C_6H_5O$— | $CH_3CO_2CH_2$— |
| $C_6H_5O$— | $CH_3(CH_2)_2CO_2CH(C_2H_5)$— |
| $C_6H_5O$— | $CH_3CO_2CH(n-C_3H_7)$— |
| $C_6H_5O$— | $(CH_3)_2CHCO_2CH(CH_3)$— |
| $C_6H_5O$— | $CH_3CO_2CH(CH_3)$— |
| $C_6H_5O$— | $(CH_3)_3CO_2CH(i-C_3H_7)$— |

EXAMPLE 3

Phenylketene-N-(2-[p-nitrobenzyloxycarbonyl]-3,3-dimethyl-7-oxo-4-thia-1-azabicyclo[3.2.0]hept-6-yl)imine (III and IV: R = $C_6H_5$; $R_1$ = p—$NO_2C_6H_4CH_2$—)

A. N-(2-[p-Nitrobenzyloxycarbonyl]-3,3-dimethyl-7-oxo-4-thia-1-azabicyclo-[3.2.0]hept-6-yl)phenylacetimidyl chloride (II: R = $C_6H_5$; $R_1$ = p—$NO_2C_6H_4CH_2$—)

To a thoroughly dried flask fitted with a drying tube and stirrer is added 4.69 g. (0.01 mole) of 6-phenylacetamidopenicillanic acid, p-nitrobenzyl ester dissolved in 85 ml. of dry methylene chloride and the resulting solution cooled in an ice bath. Three and four-tenths grams (0.044 mole) of pyridine is added to the cold solution followed by 2.3 g. (0.011 mole) of phosphorous pentachloride over a period of 10 minutes. The reaction mixture is allowed to stir in the cold for an additional 30 minutes and is then treated with an iced solution of sodium bicarbonate with gentle stirring. The organic phase is washed successively with sodium bicarbonate and then a saturated brine solution, then is separated and dried over anhydrous sodium sulfate. Removal of the solvent under reduced pressure leaves the desired product as a brown foam which is employed directly in the next reaction without purification.

B. Phenylketene-N-(2-[p-nitrobenzyloxycarbonyl]-3,3-dimethyl-7-oxo-4-thia-1-azabicyclo[3.2.0]hept-6-yl)imine (III and IV: R = $C_6H_5$; $R_1$ = p—$NO_2C_6H_4$—)

A solution consisting of 8.74 g. (0.02 mole) of N-(2-[p-nitrobenzyloxycarbonyl]-3,3-dimethyl-7-oxo-4-thia-1-azabicyclo[3.2.0]hept-6-yl)phenylacetimidyl chloride in 75 ml. of benzene is treated dropwise with 1.8 g. (0.018 mole) of triethylamine. The reaction mixture is allowed to stir at room temperature for an additional hour and the solvent is removed in vacuo. The residue is extracted several times with ether and the ether layers combined and dried over anhydrous sodium sulfate. Removal of the ether leaves the desired product as a tan foam which is employed in subsequent reactions without further purification.

EXAMPLE 4

Following the general procedure of Example 3, and starting with the requisite penicillin ester, the following compounds are synthesized:

| R | $R_1$ |
|---|---|
| $C_6H_5$— | $C_6H_5CH_2$— |
| $C_6H_5O$— | $C_6H_5CH_2$— |
| $C_6H_5O$— | $4-NO_2C_6H_4CH_2$— |
| $C_6H_5O$— | $4-BrC_6H_4CH_2$— |
| $C_6H_5$— | $4-BrC_6H_4CH_2$— |
| $C_6H_5$— | $C_6H_5COCH_2$— |
| $C_6H_5O$— | $C_6H_5COCH_2$— |
| $C_6H_5$— | $3,5-(t-C_4H_9)_2-4-HOC_6H_2CH_2$— |
| $C_6H_5O$— | $3,5-(t-C_4H_9)_2-4-HOC_6H_2CH_2$— |
| $C_6H_5O$— | $(4-CH_3OC_6H_4)_2CH$— |
| $C_6H_5$— | $(4-CH_3OC_6H_4)_2CH$— |
| $C_6H_5$— | $C_6H_5CH=N$— |
| $C_6H_5O$— | $C_6H_5CH-N$— |

EXAMPLE 5

Phenylketene-N-(2-[trimethylsilyloxycarbonyl]-3,3-dimethyl-7-oxo-4-thia-1-azabicyclo[3.2.0]hept-6-yl)imine (III and IV: R = $C_6H_5$; $R_1$ = $(CH_3)_3Si-$)

A. N-(2-[Trimethylsilyloxycarbonyl]-3,3-dimethyl-7-oxo-4-thia-1-azabicyclo-[3.2.0]hept-6-yl)phenylacetimidyl chloride (II: R = $C_6H_5$; $R_1$ = $(CH_3)_3Si-$)

To a solution of 8.1 g. (0.02 mole) of 6-phenylacetamidopenicillanic acid, trimethylsilyl ester in 175 ml. of methylene chloride and cooled in an ice bath is added 1.58 g. (0.02 mole) of pyridine. While the solution is being gently stirred, 1.96 g. (0.02 mole) of phosgene gas is gradually introduced below the surface of the solvent. The resulting reaction is allowed to stir at ice-bath temperatures for an additional 20-30 minutes and is then concentrated under reduced pressure to dryness. The residual product plus pyridine hydrochloride is extracted several times with ether and the ether extracts containing the desired product are combined and concentrated in vacuo. The residual imino chloride is used without further purification.

B. Phenylketene-N-(2-[trimethylsilyloxycarbonyl]-3,3-dimethyl-7-oxo-4-thia-1-azabicyclo[3.2.0]hept-6-yl)imine (III and IV: R = $C_6H_5$; $R_1$ = $(CH_3)_3Si-$)

A solution of 12.7 g. (0.03 mole) of N-(2-[trimethylsilyloxycarbonyl]-3,3-dimethyl-7-oxo-4-thia-1-azabicyclo[3.2.0]hept-6-yl)phenylacetimidyl chloride in 75 ml. of benzene is treated with 2.8 g. (0.028 mole) of triethylamine and the resulting reaction mixture allowed to stir at room temperature for 80 minutes. The solvent is removed in vacuo and the residual semi-solids are extracted several times with ether. The combined ether layers are then concentrated to dryness under reduced pressure to provide the crude product which is employed in the next reaction without further purification.

In an analogous manner, the congener wherein R is phenoxy and $R_1$ is trimethylsilyl is similarly prepared.

EXAMPLE 6

6-(5-methyl-3-phenyl-4-isoxazolylamido)penicillanic acid (oxacillin)

A. N-Phenylacetyl-N-(5-methyl-3-phenyl-4-isoxazolecarbonyl)-6-aminopenicillanic acid, pivaloyloxymethyl ester (V and VI: R = $C_6H_5$; $R_1$ = $(CH_3)_3CCO_2CH_2-$)

To a solution of 13.0 g. (0.03 mole) of phenylketene-N-(2-[pivaloyloxymethyloxycarbonyl]-3,3-dimethyl-7-oxo-4-thia-1-azabicyclo[3.2.0]hept-6-yl)-imine from Example 1-B in 150 ml. of ether is added 6.1 g. (0.03 mole) of 5-methyl-3-phenylisoxazole-4-carboxylic acid and the resulting slurry allowed to stir at room temperature for about 16-18 hours. The reaction mixture is transferred to a separatory funnel and washed successively with 3 × 2% sodium bicarbonate, 2 × water and 3 × saturated sodium chloride solution. The organic phase is separated, dried over sodium sulfate and concentrated under reduced pressure to a yellow-brown foam, 14.5 g.

Purification of several combined experiments (23.7 g.) is carried out by chromatographing on a column packed with 1200 ml. of silica gel in 4:1 benzene-ether. Fractions of 250 ml. are collected using the same solvent ratio as the eluate. Fractions 2 and 3 are combined and the solvent removed in vacuo. The residual product, 7.1 g., when subjected to analysis via nuclear magnetic resonance spectroscopy indicated a mixture of approximately 40% "normal" and 60% epi products.

B. 6-(5-Methyl-3-phenyl-4-isoxazolylamido)penicillanic acid, pivaloyloxymethyl ester (VII: $R_1$ = $(CH_3)_3CCO_2CH_2-$)

To a solution of 7.0 g. (0.011 mole) of N-phenylacetyl-N-(5-methyl-3-phenyl-4-isoxazolecarbonyl)-6-aminopenicillanic acid, pivaloyloxymethyl ester from A in 120 ml. of dry benzene is added dropwise 1.18 g. (0.012 mole) of cyclohexylamine and the resulting solution allowed to stir at room temperature for 4.5 hours. The reaction mixture is diluted with ether and washed successively with 3 × 2 ml. of 2N hydrochloric acid in 100 ml. of water, 3 × with 2% sodium bicarbonate solution, 3 × with water and, finally, 3 × with a saturated brine solution. The organic phase is separated, dried over sodium sulfate and concentrated to dryness in vacuo, 7.1 g.

The residual brown foam is applied to a column packed with 700 ml. of silica gel and eluted with a solvent comprised of 90% benzene - 10% ether. Fractions of 25 ml. each are collected with an automatic fraction collector at the rate of six fractions per hour. Fractions 106–166 are combined and the solvent almost completely removed under reduced pressure. On scratching and seeding a solid cake forms after approximately one hour. The solid is triturated with an iced solution of 75% ether in hexane, 901 mg. The product is dissolved in a minimum amount of benzene, charcoaled and the filtrate treated dropwise with hexane until the volume is 35–40% hexane. When the product commences to crystallize, the volume is adjusted to a ratio of 1:1 cyclohexane benzene and the mixture allowed to stir in an open container. The product is filtered and dried in vacuo. Two additional recrystallization provide the pure normal epimer, 447 mg., m.p. 129°–131.5° C.

Repeating the above procedure for fractions 167–200 provides an additional 204 mg. of the desired product.

| Anal. Calcd. for $C_{25}H_{29}O_7N_3S$: | C, 58.2; H, 5.7; N, 8.1; S, 6.2. |
|---|---|
| Found: | C, 58.2; H, 5.7; N, 8.1; S, 6.2. |

C. 6-(5-Methyl-3-phenyl-4-isoxazolylamido)penicillanic acid (oxacillin)

To a solution of 100 mg. of 6-(5-methyl-3-phenyl-4-isoxazolylamido)-penicillanic acid, pivaloyloxymethyl ester in 4 ml. of acetone is added 4 ml. of a pH 10.5 borate buffer and the reaction allowed to stir at room temperature for eight minutes. The mixture is diluted with 10 ml. of ethyl acetate and the pH adjusted to 2.0 with 10% hydrochloric acid. The organic phase is separated, the aqueous layer extracted once again with ethyl acetate and the organic extracts combined and dried over sodium sulfate. An equal volume of ether is added followed by an ethyl acetate solution of sodium 1-ethylhexanoate. The desired product crystallizes on standing and cooling overnight, 34 mg.

The product is identical in every respect with a sample of commercial oxacillin.

EXAMPLE 7

In an analogous manner, oxacillin is synthesized from the ketenimine penicillins of Example 2 employing the general procedure of Example 6.

EXAMPLE 8

6-(5-Methyl-3-phenyl-4-isoxazolylamido)penicillanic acid (oxacillin) via p-nitrobenzyl ester A. N-Phenylacetyl-N-(5-methyl-3-phenyl-4-isoxazolecarbonyl)-6-aminopenicillanic acid, p-nitrobenzyl ester (V and VI: R = $C_6H_5$; $R_1$ = p—$NO_2C_6H_4CH_2$—)

To an ether solution (200 ml.) containing 18.0 g. (0.04 mole) of phenylketene-N-(2-[p-nitrobenzyloxycarbonyl]-3,3-dimethyl-7-oxo-4-thia-1-azabicyclo[3.2.0]hept-6-yl)imine from Example 3B is added portionwise 8.1 g. (0.04 mole) of 5-methyl-3-phenylisoxazole-4-carboxylic acid and the resulting suspension allowed to stir at room temperature for 18 hours. The reaction mixture is extracted several times with a 2% sodium bicarbonate solution, water and, finally, a saturated brine solution. The organic layer is separated, dried over anhydrous sodium sulfate and concentrated under reduced pressure to a tan foam.

The product is purified by chromatographing on a silica gel column employing an eluate of 4:1 benzene-ether. Fractions of 200 ml. each are collected and assayed by thin layer chromatography; the product rich fractions are combined and the solvent removed in vacuo. The residual product, which by nuclear magnetic resonance is comprised of epimers in the ratio of 40% normal and 60% epi, is utilized without further purification.

B. 6-(5-Methyl-3-phenyl-4-isoxazolylamido)penicillanic acid, p-nitrobenzyl ester, (VII: $R_1$ = p-$NO_2C_6H_4CH_2$—)

A solution of 6.5 g. (0.01 mole) of N-phenylacetyl-N-(5-methyl-3-phenyl-4-isoxazolecarbonyl)-6-aminopenicillanic acid, p-nitrobenzyl ester from A contained in 110 ml. of dry benzene is treated dropwise with 1.1 g. (0.011 mole) of cyclohexylamine and the resulting reaction mixture allowed to stir at room temperature for 5 hours. The solution is diluted with ether and washed successively with a 2% sodium bicarbonate solution, water and a saturated salt solution. The solvent phase is separated, dried over sodium sulfate and concentrated to dryness in vacuo.

In a procedure similar to that of Example 6B the residual brown foam is chromatographed on a silica gel column and the fractions rich in the normal isomer, as assayed by nuclear magnetic resonance, are combined. The solvent is removed from the combined fractions and the residual product purified by recrystallization from benzene-hexane.

C. 6-(5-Methyl-3-phenyl-4-isoxazolylamido)penicillanic acid (oxacillin)

A suspension of 536 mg. (0.001 mole) of 6-(5-methyl-3-phenyl-4-isoxazolylamido)penicillanic acid, p-nitrobenzyl ester from B and 100 mg. of 10% palladium on charcoal in 75 ml. of ethyl acetate is shaken in an atmosphere of hydrogen at an initial pressure of 10 p.s.i. When the theoretical amount of hydrogen has been absorbed (0.004 mole) the catalyst is filtered and the ethyl acetate layer is concentrated to 20 ml., diluted with ether and treated dropwise with an ethyl acetate solution of sodium 1-ethylhexanoate. The sodium salt of oxacillin which crystallizes from the stirred, chilled solution is filtered and dried in vacuo. It is identical in every respect with that isolated from Example 6C and with a commercial sample.

EXAMPLE 9

Employing the general procedure of Example 8, oxacillin, identical with a commercial sample, is prepared wherein the following ketenimine penicillins are utilized as the starting reagents:

Phenylketene-N-(2-[benzyloxycarbonyl]-3,3-dimethyl-7-oxo-4-thia-1-azabicyclo[3.2.0]hept-6-yl)imine;

phenoxyketene-N-(2-[benzyloxycarbonyl]-3,3-dimethyl-7-oxo-4-thia-1-azabicyclo[3.2.0]hept-6-yl)imine;

phenoxyketene-N-(2-[p-nitrobenzyloxycarbonyl]-3,3-dimethyl-7-oxo-4-thia-1-azabicyclo[3.2.0]hept-6-yl)imine;

phenoxyketene-N-(2-[p-bromobenzyloxycarbonyl]-3,3-dimethyl-7-oxo-4-thia-1-azabicyclo[3.2.0]hept-6-yl)imine;

phenylketene-N-(2-[p-bromobenzyloxycarbonyl]-3,3-dimethyl-7-oxo-4-thia-1-azabicyclo[3.2.0]hept-6-yl)imine;

phenoxyketene-N-(2-bis[p-anisyl]methyl-3,3-dimethyl-7-oxo-4-thia-1-azabicyclo[3.2.0]hept-6-yl)imine; and phenylketene-N-(2-bis[p-anisyl]methyl-3,3-dimethyl-7-oxo-4-thia-1-azabicyclo[3.2.0]hept-6-yl)imine.

EXAMPLE 10

Starting with the appropriate ketenimine penicillin from Example 4 and utilizing the procedure of Example 6A-B the following oxacillin esters are synthesized:

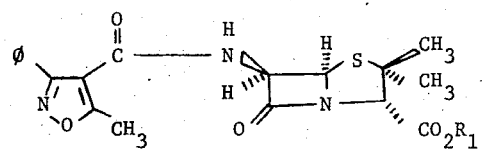

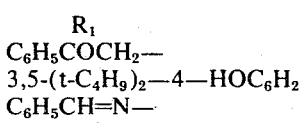

$R_1$
$C_6H_5COCH_2$—
3,5-(t-$C_4H_9$)$_2$—4—HO$C_6H_2CH_2$—
$C_6H_5CH=N$—

EXAMPLE 11

6-(5-Methyl-3-phenyl-4-isoxazolylamido)penicillanic acid (oxacillin) via the phenacyl ester A solution of 1.04 g. (0.002 mole) of 6-(5-methyl-3-phenyl-4-isoxazolylamido)penicillanic acid, phenacyl ester from Example 10 and 224 mg. (0.002 mole) of sodium thiophenoxide in 5 ml. of dimethylformamide is allowed to stir at room temperature for 30 minutes. The reaction mixture is diluted with ether and the mixture allowed to stir at ice-bath temperatures for an additional 10 minutes. The sodium salt of oxacillin is filtered and washed several times with ether. The isolated product is identical with a commercial sample and with that prepared in previous examples.

EXAMPLE 12

6-(5-Methyl-3-phenyl-4-isoxazolylamido)penicillanic acid (oxacillin) via the benzylideneimino ester In a manner similar to the procedure of Example 11, oxacillin is prepared by contacting 504 mg. (0.001

A mixture of 78.5 g. of acetyl chloride, 30 g. of dry paraformaldehyde and a minute amount of fused zinc chloride is heated on a water bath until a complete solution has been effected. The reaction mixture is then distilled in vacuo to provide the desired product, b.p. 113°–115° C./748 mm.

b. Employing the above procedure, which is that taught by Ulich et. al., *J. Am. Chem. Soc.*, 43, 660 (1921), and the appropriate commercially available starting reagents, the following 1-alkanoyloxyalkyl halides are prepared:

α-chloroethyl acetate; α-chloroethyl isobutyrate; α-chloroethyl pivalate; α-chloro-n-propyl acetate; α-bromo-n-propyl butyrate; α-chloromethyl isovalerate; α-chloro-n-propyl pivalate; α-chloro-n-butyl acetate and α-chloroiso-butyl acetate.

c. 6-phenylacetamidopenicillanic acid, benzylideneimino ester.

To a suspension of 3.72 g. (0.01 mole) of benzylpenicillin potassium salt cooled to −5° C. is added dropwise 0.96 ml. of ethyl chloroformate and one drop of pyridine. After stirring the mixture for 30 minutes in the cold, 1.2 g. (0.01 mole) of benzaldehyde oxime in 7 ml. of acetone is added and the resulting reaction mixture is then allowed to stir at room temperature for 2 hours. The mixture is filtered and the filtrate evaporated to dryness in vacuo. The crude product is dissolved in ethyl acetate and is subsequently washed successively with 10 ml. portions of water, sodium bicarbonate and water. The organic layer is separated, dried over magnesium sulfate, concentrated to a small volume and diluted with ether. The precipitated product is filtered and dried, m.p. 140°–142° C.

The above procedure, which is essentially that as taught by Fosker et al., *J. Chem. Soc.* (c), 1917 (1971), is employed in the preparation of 6-phenoxyacetamidopenicillanic acid, benzylideneimino ester.

What is claimed is:

1. A compound of the formula:

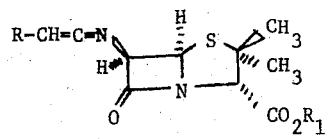

wherein R is selected from the group consisting of phenyl and phenoxy and $R_1$ is selected from the group consisting of 1-alkanoyloxyalkyl wherein said alkanoyloxy has from 2 to 5 carbon atoms and said alkyl has from 1 to 4 carbon atoms; phenacyl; benzyl and substituted benzyl wherein said substituent is selected from the group consisting of 4-bromo, 4-nitro and 3,5-di-t-butyl-4-hydroxy; bis(4-methoxyphenyl)-methyl; trimethylsilyl; and benzylideneimino.

2. A compound of claim 1 wherein R is phenyl and $R_1$ is substituted alkyl wherein said alkyl has from 1 to 4 carbon atoms and said substituent is 1-alkanoyloxy having from 2 to 5 carbon atoms.

3. The compound of claim 2 wherein $R_1$ is $(CH_3)_3CCO_2CH_2-$.

4. A compound of claim 1 wherein $R_1$ is trimethylsilyl.

5. The compound of claim 4 wherein R is phenyl.

6. A compound of claim 1 wherein R is phenyl and $R_1$ is selected from the group consisting of benzyl and substituted benzyl wherein said substituent is selected from the group consisting of 4-bromo, 4-nitro and 3,5-di-t-butyl-4-hydroxy.

7. The compound of claim 6 wherein $R_1$ is 4-nitrobenzyl.

* * * * *